Oct. 24, 1939.  W. G. FOTSCH  2,177,364
LINE SPLICE
Filed Feb. 15, 1937
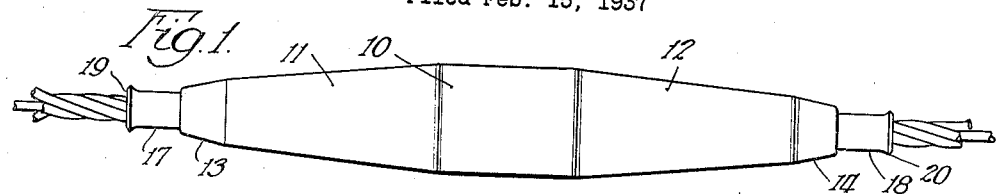
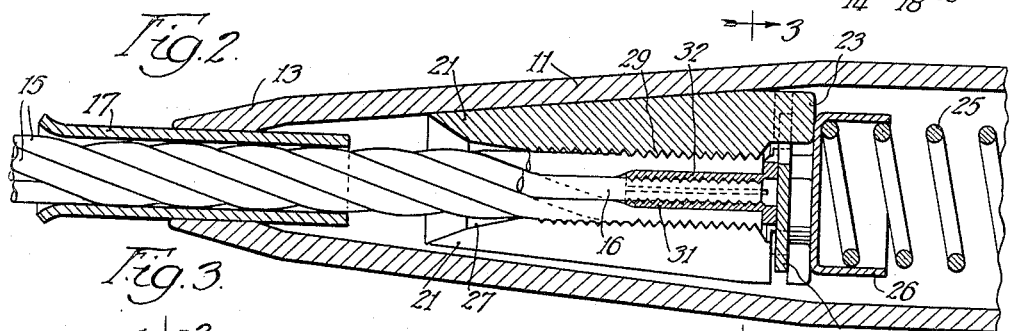
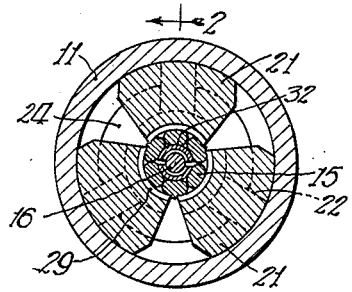
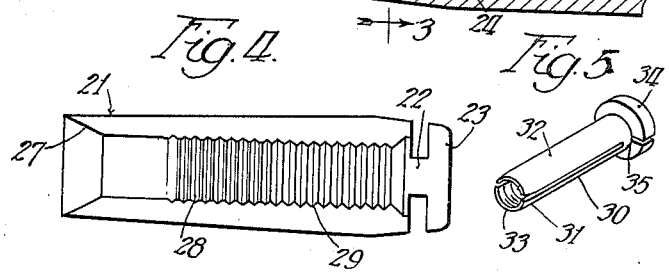
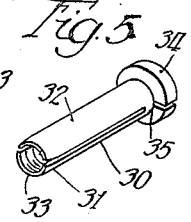
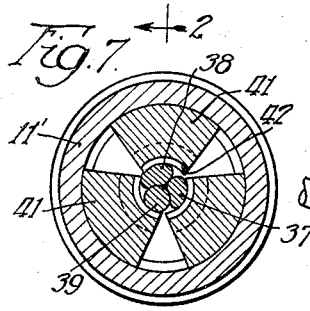
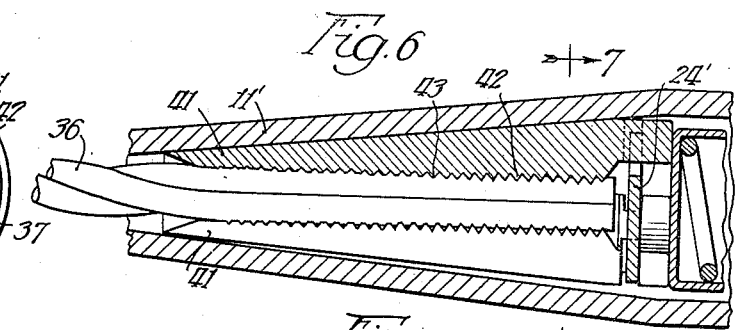
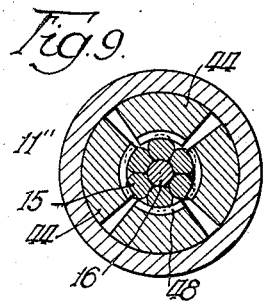
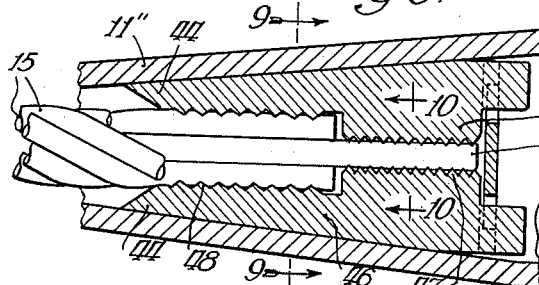
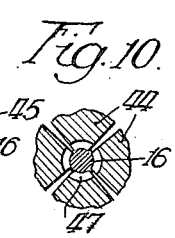
Inventor
William G. Fotsch
By: Zabel Carlson & Wells, Attys.

Patented Oct. 24, 1939

2,177,364

UNITED STATES PATENT OFFICE 2,177,364

LINE SPLICE

William G. Fotsch, Chicago, Ill., assignor to Reliable Electric Company, Chicago, Ill., a corporation of Illinois Application February 15, 1937, Serial No. 125,838

2 Claims. (Cl. 24—126)

The present invention relates to line splices and is particularly adapted to the connecting of conductors of the type wherein the strands thereof are reenforced in order to withstand extremely high strains.

In line splices for this purpose it is highly essential that the jaws of the splices be so arranged as to produce an adequate gripping throughout the length of the jaw and to prevent gripping along a particular line transversely of the jaw.

It is the principal purpose of the present invention, therefore, to provide a novel line splice having means whereby the gripping of the jaws of the line splice upon the conductor may be distributed according to the ability of the conductor strands to withstand the gripping action.

It is also a purpose of the present invention to provide a line splice of this character wherein those conductors which are made up with outside strands of high conductivity and low tensile strength arranged about an inside strand of high tensile strength may be gripped in such fashion as to deliver the greater gripping power to the high tensile strength strand.

The features and advantages of the invention will more readily appear as the description proceeds reference being had to the accompanying drawing wherein a preferred form of the invention is shown. It is to be understood, however, that the drawing and description are illustrative only and are not to be taken as limiting the invention except in so far as it is limited by the claims.

In the drawing—

Fig. 1 is a view in side elevation of a line splice embodying the present invention;

Fig. 2 is an enlarged longitudinal section through one half of the line splice illustrating the interior construction thereof;

Fig. 3 is a sectional view on the line 3—3 of Fig. 2;

Fig. 4 is a detailed view of one of the gripping jaws;

Fig. 5 is a detailed view in perspective of an interior gripping member;

Fig. 6 is an enlarged longitudinal sectional view through a slightly modified form of the invention;

Fig. 7 is a sectional view on the line 7—7 of Fig. 6;

Fig. 8 is an enlarged longitudinal sectional view through a further modification of the invention;

Fig. 9 is a sectional view on the line 9—9 of Fig. 8;

Fig. 10 is a fragmentary sectional view on the line 10—10 of Fig. 8.

Referring now in detail to the drawing, the invention is shown as embodied in a conventional line splice comprising a tube 10 which may be of any suitable material such as copper and which is tapered at its opposite ends as shown at 11 and 12 by swaging or otherwise. The tapered portions 11 and 12 terminate in a pair of tips 13 and 14 which are tapered to a slightly greater degree in order to eliminate square shoulders and facilitate sliding of the splice over cross arms and the like.

The first form of the invention shown in Fig. 2 is particularly adapted for the gripping of that type of conductor having a series of strands of high conductivity and low tensile strength arranged about a core of high tensile strength. For example, the conductor may be composed of a plurality of outer strands 15 of aluminum and a core 16 of steel wire.

For the purpose of protecting the strands at the opposite ends of the line splice, a pair of sleeves 17 and 18, which are bell shaped at their outer ends as indicated at 19 and 20, may be used if desired. The gripping mechanism by means of which the conductors are gripped within the sleeve 10 comprises a plurality of jaws 21 which are interlocked by means of a neck portion 22 and a head 23 with a holding member or disk 24 having suitable slots in which the neck portions 22 are received. The jaws 21 are pressed toward the open ends of the line splice by a spring 25 which bears against the head portions 23 of the jaws. Suitable cups such as 26 may be used, if desired, for the opposite ends of the spring 25. The jaws 21, only one of which will be described in detail since they are alike, may be constructed of any suitable material of sufficient hardness and strength. It will be noted that the jaw is provided with a bevelled portion at 27 to facilitate entrance of the wire.

The gripping surface of the jaw consists of a multiplicity of teeth or serrations 28 which are bevelled slightly at the top from the small end of the jaw toward the larger end thereof. These flattened teeth or jaws extend only part way, as shown about half way, to the back end of the gripping portion of the jaw. The remainder of the gripping portion of the jaw is provided with deeper serrations 29 so that the teeth formed thereon are capable of penetrating farther into the metals of the conductors 15.

In order to obtain a firm grip upon the conductor 16, a clamping device 30 is used. This device comprises a headed member having two opposed jaws 31 and 32, provided with serrations 33, and a head 34. The jaws 31 and 32 are preferably formed by splitting the member 30 substantially throughout its length, a small portion being left at 35 to hold the parts together. This member 30 is driven into the end of the conductor so as to surround the conductor 16, with the conductors 15 being arranged around the member 30.

Now when the jaws 21 are forced toward the smaller ends of the portions 11 of the line splice, the teeth of these jaws sink into the softer strands 15, the back end of the jaws biting deeper because of the serrations 29 and practically pressing the strand 15 into a flattened condition as shown best in Fig. 3. This excessive pressure is communicated to the jaws 31 and 32 of the member 30 so as to cause them to bite into the steel core 16.

The member 30 is constructed of a material hard enough to bite into the strand 16 and has a high tensile strength in order that it can withstand the necessary strain to utilize the full tensile strength of the strand 16. The jaws 31 and 32 are made as thin as they can be to give the requisite strength so that the increase in over all diameter of the conductor, due to the insertion of the member 30, is kept at a minimum.

The gripping action of the jaws 21 and the jaws 31 and 32 is distributed, due to the construction of the jaws, so as to obtain an efficient combination of direct gripping upon the strand 16 and additional gripping upon the softer strands 15. The greatest amount of pressure exerted by the jaws 21 is at the rear or large end where the serrations 29 are deeply embedded into the strands 15 so as to flatten these strands and communicate a substantial pressure to the jaws 31 and 32. The strands 15, surrounding the jaws 31 and 32, are so compressed as to prevent any slipping of the jaws 21 thereon, and, since the head 34 of the member 30 abuts against the ends of these strands, the member 30 is held against endwise displacement with respect to the jaws 21 by the ends of the strands 15. The material of the strands 15 is in reality under compression as a cushioning layer between the faces of the serrations 29 and the head 34 of the member 30. The serrations 28 toward the smaller ends of the jaws 21, since they are gradually reduced in height, act to distribute the gripping action upon the strands 15 throughout the extent of the serrations 28. In this fashion, the total tensile strength of the conductor, composed of the strands 15 and the core 16, is utilized by the gripping of the line splice.

Referring now to the form of the invention shown in Figs. 6 and 7, in this form, the conductor 36 is shown as one of the type wherein two strands 37 and 38 are of copper, and a third strand 39 is of the so-called copper clad type, that is, a steel wire coated with copper. With this type of conductor, the construction of the gripping jaws of the line splice is such as to evenly distribute the gripping effect of the jaws over a substantial distance in order that the copper clad conductor 39 may be subjected to sufficient pressure at the back end of the gripping jaws to utilize its full strength while, toward the front end of the jaws, the strands 37 and 38 may be gripped more lightly and thus not cut by the serrations of the jaws. As shown in this form of the invention, a plurality of jaws 41 are provided with deep sharp serrations 42 at the back ends thereof, the height of the serrations gradually reducing from a point 43 toward the smaller ends of the jaws 41 until the serrations are reduced to practically zero height at the small ends of the jaws.

As shown in Fig. 7, the effect at the rear end where the serrations 42 are found is to compress and flatten the copper conductors 37 and 38 so that a greater amount of pressure can be applied to the copper clad conductor 31 to thereby utilize its strength to a greater degree. Toward the smaller end of the jaws 41, the serrations penetrate to a lesser and lesser degree thus enabling the jaws to grip the softer strands 37 and 38 without weakening them by cutting in too deep and thus utilize the full strength of these strands as well as the strength of the strand 39.

In the form of the invention shown in Figs. 8, 9, and 10, a modification of the structure shown in Fig. 2 is employed whereby the member 30 is eliminated. In this structure, a plurality of jaws 44 are formed with thick sections at 45 and thinner sections 46, the thick sections 45 having relatively sharp serrations 47, while the thin sections 46 have more widely spaced flatter serrations 48. The soft strands 15 of the cable are gripped by the serrations 48, while the center core 16, which is a hard high tensile strength core, is gripped directly by the serrations 47. In this fashion, a distributed gripping action is again obtained whereby the greatest pressure is applied to the strand 16 of high tensile strength, while a lower pressure is applied to the soft strands 15 so as to utilize their tensile strength in addition to that of the strand 16.

In the several forms of the invention, it will be noted that the construction of the line splice is such that the greatest gripping pressure is applied at the large or back end of the jaws and that this pressure is so applied as to utilize the high tensile strength of the conductor which has such high tensile strength. By graduating the jaw pressure in this fashion, it is possible to utilize the total tensile strength of the conductor in a very efficient manner.

From the above description, it is believed that the construction and advantages of this device will be readily apparent to those skilled in the art.

Having thus described my invention, what I claim as new and desire to secure by United States Letters Patent is:

1. In a line splice of the character described a tube having a tapered bore, tapered jaws therein engaging the tube and having gripping portions to grip the outer strands of a stranded conductor composed of a plurality of relatively soft strands arranged around a hard core, an elongated cylindrical gripping member surrounded by said jaws and insertible between the soft strands and the core, said gripping member being compressible upon the core by pressure communicated to it from said jaws through the soft strands.

2. In a line splice of the character described, a tube having a tapered bore, tapered jaws therein engaging the tube and having gripping portions to grip the outer strands of a stranded conductor composed of a plurality of relatively soft strands arranged around a hard core, a gripping member insertible between said jaws and between the soft strands and the core, said gripping member being compressible upon the core by pressure communicated to it from said jaws through the soft strands, said gripping member comprising a longitudinally slotted cylindrical tube having gripping teeth on the interior surface, and having a head thereon overlapping the ends of the soft strands.

WILLIAM G. FOTSCH.